United States Patent
Simon

(10) Patent No.: US 8,473,122 B2
(45) Date of Patent: Jun. 25, 2013

(54) METHOD FOR ACTIVELY DEFORMING AN AERODYNAMIC PROFILE

(75) Inventor: Georges-Henri Simon, Wissous (FR)

(73) Assignee: Thales, Neuilly sur Seine (FR)

( * ) Notice: Subject to any disclaimer, the term of this patent is extended or adjusted under 35 U.S.C. 154(b) by 195 days.

(21) Appl. No.: 12/993,391

(22) PCT Filed: Feb. 2, 2009

(86) PCT No.: PCT/EP2009/051158
§ 371 (c)(1),
(2), (4) Date: May 19, 2011

(87) PCT Pub. No.: WO2009/101001
PCT Pub. Date: Aug. 20, 2009

(65) Prior Publication Data
US 2011/0224846 A1    Sep. 15, 2011

(30) Foreign Application Priority Data
Feb. 12, 2008 (FR) .................................. 08 00748

(51) Int. Cl.
*G05D 3/00* (2006.01)
*B64C 1/00* (2006.01)
*B64C 3/00* (2006.01)
*B64C 9/00* (2006.01)
*B64C 21/00* (2006.01)

(52) U.S. Cl.
USPC .............. 701/3; 701/21; 244/123.5; 244/133; 244/201; 244/204

(58) Field of Classification Search
USPC .................. 701/3, 21; 416/1; 244/123.5, 124, 244/133, 201, 204, 219; 144/140
See application file for complete search history.

(56) References Cited

U.S. PATENT DOCUMENTS

| | | | |
|---|---|---|---|
| 5,662,294 A | 9/1997 | Maclean et al. | |
| 5,931,422 A * | 8/1999 | Geiger et al. | 244/214 |
| 8,286,909 B2 * | 10/2012 | Lee | 244/29 |
| 2002/0125376 A1 * | 9/2002 | Karniadakis et al. | 244/204 |
| 2005/0230546 A1 | 10/2005 | McKnight et al. | |
| 2009/0200416 A1 * | 8/2009 | Lee | 244/30 |
| 2010/0286850 A1 * | 11/2010 | Collot et al. | 701/7 |

OTHER PUBLICATIONS

International Search Report and Written Opinion in PCT/EP2009/051158 dated Apr. 22, 2009.

* cited by examiner

*Primary Examiner* — Khoi Tran
*Assistant Examiner* — Robert Nguyen
(74) *Attorney, Agent, or Firm* — Stroock & Stroock & Lavan LLP

(57) ABSTRACT

The present invention relates to a method for actively deforming, by feedback control, an aerodynamic profile comprising an elastic material, applied to a part of the surface of the aerodynamic profile, said elastic material being in contact with a fluid flow; said elastic material being able to be deformed by one or more shape memory actuators placed in contact with the elastic material, said actuators being controlled by a computer connected to sensors. This method applies notably to a deformation of an aerofoil of a wing of an aircraft in flight, notably subsonic.

21 Claims, 4 Drawing Sheets

METHOD FOR ACTIVELY DEFORMING AN AERODYNAMIC PROFILE

This application is a national phase application under §371 of PCT/EP2009/051158, filed Feb. 2, 2009, which claims priority to French Patent Application No. 0800748, filed Feb. 12, 2008, the entire content of which is expressly incorporated herein by reference.

BACKGROUND OF THE INVENTION

The present invention relates to a method for actively deforming an aerodynamic profile. This method is applied, for example, to a deformation of an aerofoil of a wing of an aircraft in flight, notably subsonic.

BRIEF DESCRIPTION OF THE PRIOR ART

In the field of aeronautical construction, there is an ongoing concern to improve the aerodynamics of the aircraft and the extent of the flight range of the aircraft. Improving the aerodynamics of an aircraft, and notably of its wings, makes it possible to improve the lift of the aircraft, thus limiting its energy consumption. The flight range of an aircraft is notably defined by the flight mechanics of the aircraft. The flight mechanics can be defined by a study of the flight qualities of an aircraft, notably in terms of trajectory and attitude. The flight mechanics notably take into account a geometrical configuration of the aircraft, its aerodynamics, its weight, the position of its center of gravity and its engines, and dynamic data such as feedback control systems and flight controls of the aircraft. The study of aerodynamics and flight mechanics is also called aeromechanics.

Generally, the lift of a wing is degraded because of the occurrence of a turbulent flow of air over a portion of the upper surface of the wing. Transition points can be defined between a laminar flow of threads of air over the wing and a turbulent flow of these threads of air. The transition points are therefore points of separation of the threads of air from the wing. The position of the separation points is notably linked to the profile of the wing and to the angle of incidence of the wing relative to the threads of air. A turbulence effect over a large part of an upper surface of a wing notably results in a loss of lift and an increase in the drag of the wing, which leads to excess consumption of fuel of the aircraft.

An objective that is sought by aircraft constructors and in particular aircraft aerofoil constructors is to minimize the turbulence effects on the wing for a large part of the flight range of the aircraft. A reduction of the turbulence effects can be obtained by maximizing the distance of the discontinuity in the threads of air from the leading edge of the wing.

Conventionally, each wing profile, before being constructed, is the subject of simulations and wind tunnel tests to check that its aeromechanical qualities are as expected. The wing profiles are defined in such a way as to ensure maximum lift of the wing with minimum drag, for the different flight phases, which are:
cruising flight;
flight at low speeds;
take-off;
landing.
The wing profiles are also defined according to the type of aircraft and its anticipated use.

The duly defined wing profiles represent a trade-off between various stresses specific to each flight phase. The profiles therefore exhibit laminar effects during certain flight phases dependent on the chosen trade-offs. Once the wing profiles have been defined, they can no longer be modified.

One solution may be to modify the curvature of the upper surface of the wing to absorb the turbulences during the different flight phases:
by distancing the transition points between the laminar flow of the threads of air over the wing and the turbulent flow of the threads of air over the wing from the leading edge;
by keeping the threads of air flat against the upper surface of the wing.

A modification of the curvature of the upper surface of the wing can be obtained by deforming the external structure of the upper surface of the wing by stress from actuators. One solution known from the prior art consists:
in using sensors based on optical fiber to measure the position of the transition points, then
in modifying the external structure of the upper surface by virtue of piezoelectric actuators.

This solution has many drawbacks. Its drawbacks include the fact that the behavior of the piezoelectric actuators is greatly degraded at low temperature, notably below zero degrees. However, during a flight, the wings of an aircraft are subject to temperatures that can drop to minus fifty degrees. Such a solution cannot therefore be implemented on aircraft flying at an altitude where the temperature is below zero degrees. Piezoelectric actuators also have a poor working density to response time ratio. The working density represents the capacity of the actuators to deform a surface according to the extension of the actuators and the properties of the surface. A large number of actuators is therefore needed to deform a wing surface. On the one hand, the piezoelectric actuators are costly and, on the other hand, multiplying the number of actuators on a wing increases said wing's weight, thus increasing the energy consumption of the aircraft.

A deformation of the external structure can also be obtained by Joule's effect. Such an external structure can be produced from a composite material, called shape memory material, that is able to be deformed in the presence of a current and resume its initial shape after the electrical stimulation has ceased. For example, a layer of glass-reinforced fiber inserted between two layers of Nitinol can be used. Then, a Nichrome cable network can be used to carry a current within the composite material. This technique has the drawback of being costly to implement, and it requires high electrical power in order to exercise the deformation of the composite material. Furthermore, a large number of cycles is needed for the material to return to its initial shape.

Another existing solution proposes, for keeping the threads of air flat against the upper surface of the wing, a use of orifices producing air depressions capable of interacting on the air flows over the upper surface of the wing. In reality, this method provides little improvement to the aerodynamism of the wing. In practice, the orifices used have a small section of the order of a millimeter, which means that they are easily blocked by dust. Cleaning them is also very difficult. Furthermore, implementing this solution requires a complex system of capillary piping inside the wing, increasing its weight in addition to being complex to implement.

SUMMARY OF THE INVENTION

One aim of the invention is notably to mitigate the above-mentioned drawbacks. To this end, the subject of the invention is a method for actively deforming, by feedback control, an aerodynamic profile. The aerodynamic profile notably comprises an elastic material. The elastic material can be applied to a part of the surface of the aerodynamic profile. The elastic material is notably in contact with a fluid flow. The elastic material can be deformed by one or more shape memory actuators, placed in contact with the elastic material. The actuators can be controlled by a computer connected to sensors.

The deformation method can comprise at least the following steps:
measurements of physical fluid flow condition variables by the sensors;
transmissions of the measured physical flow condition variables to the computer;
detection of possible transition points between a laminar flow and a turbulent flow of the fluid over the elastic material according to the measured physical flow condition variables;
calculation of a deformation to be applied to the elastic material according to positions of the detected transition points;
calculation of one or more set points to be applied by one or more actuators to obtain the deformation to be applied to the elastic material;
transmission of the calculated set point to the actuators;
deformation of the elastic material by the actuators;
measurement of the actual deformation of the elastic material;
calculation of a new set point to be applied by one or more actuators according to the actual deformation of the elastic material.
The detection of transition points can notably comprise:
a first calculation of the viscosity coefficient of the fluid;
a second calculation of the Reynolds number characteristic of the flow of the fluid over the elastic material;
a third calculation of the positions of the possible transition points, notably including the Reynolds number, the viscosity coefficient of the fluid, an angle of incidence of the profile in the fluid relative to a horizontal plane, a speed of flow of the fluid, fluid dynamics calculation data originating from a database.

The third calculation of the positions of the transition points can take into account pressure coefficients of sensors based on optical fibers placed on the surface of the elastic material.

The third calculation of the positions of the transition points can take into account pressure coefficients of sensors based on optical fibers placed in the elastic material.

The pressure coefficients are notably coefficients relating to a reference pressure and temperature coefficient, for example measured by a reference optical fiber placed under the elastic material.

The calculation of a deformation to be applied can take into account the shape of the profile, the physical characteristics of the elastic material.

The calculation of the set points can take into account the mechanical characteristics of the actuators, the physical characteristics of the elastic material.

The deformation method can be applied to the deformation of an elastic material that is able to resume its initial shape after deformation.

The deformation method can implement actuators produced from a shape memory alloy.

The deformation method can implement actuators distributed over one or more lines of actuators. The lines of actuators can be distributed under the elastic material.

The deformation method can be applied to an aerodynamic profile in contact with air.

The deformation method can be applied to a wing profile of an aircraft.

The deformation method can implement actuators distributed over lines of actuators that are substantially parallel to a leading edge of the wing profile.

The calculation of the Reynolds number notably takes into account the flow speed of the fluid, the altitude of the aircraft, the viscosity coefficient of the fluid.

The flow speed of the fluid can originate from an anemometer situated on the aircraft.

The altitude can originate from an altimeter situated on the aircraft.

The temperature can originate from a temperature probe situated on the aircraft.

The angle of incidence can originate from an incidence probe situated on the aircraft.

The deformation method can be applied to blades of a wind turbine.

The deformation method can be applied to an aerodynamic profile immersed in water.

The deformation method can be applied to blades of a turbine.

The deformation method can be applied to an aerodynamic surface of a ship.

The deformation method can be applied to an aerodynamic surface of a submarine.

The deformation method can be applied to the deformation of a flexible skin consisting of KEVLAR carbon, registered trademark of the company Dupont de Nemours.

The notable main advantages of the invention are that it allows for a reduction in the fuel consumption of the aircraft and it improves flight safety.

BRIEF DESCRIPTION OF THE DRAWINGS

Other features and advantages of the invention will become apparent from the following description, given as a nonlimiting illustration, and in light of the appended drawings which represent.

DETAILED DESCRIPTION

Figure 1:
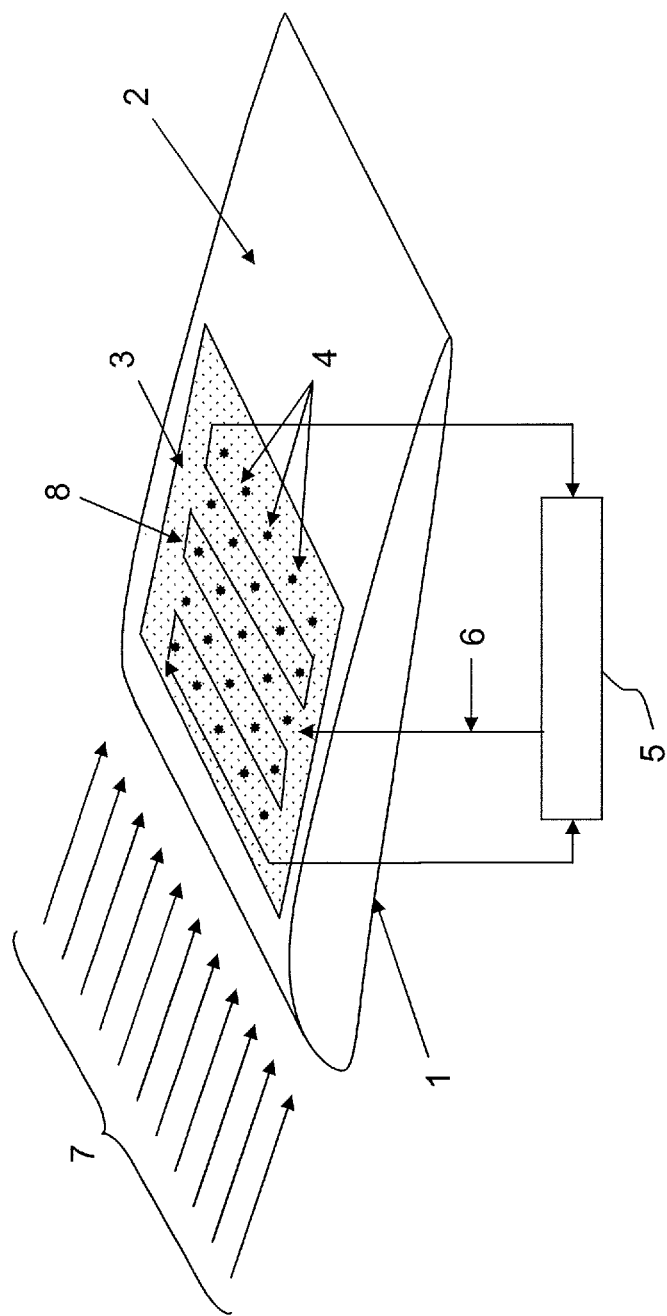
FIG. 1: a diagram of an implementation of the invention.

FIG. 1 diagrammatically represents an exemplary implementation of the method for deforming an aerodynamic profile according to the invention.

The aerodynamic profile may be, for example, a wing 1 of an aircraft placed in an airstream attacking the leading edge of the wing 1. The airstream is represented in FIG. 1 by threads of air 7. The embodiment of the invention, described hereinafter, is applied to an airplane wing but it could be applied to other parts of the airplane like the fuselage or even be applied to a part of a hull of a boat or submarine for example. Other aerodynamic profiles may also use the method for deforming the aerodynamic profile, such as wind turbine blades.

To be able to deform the upper surface 2 of the wing 1, a flexible skin 3 is pressed flat against a part of the structure of the upper surface 2 of the wing 1. The flexible skin 3 is a surface with an elastic property that can be deformed and resume its initial shape. A flexible skin can be produced using shape memory materials. The flexible skin 3 may be produced, for example, using composite materials of KEVLAR carbon type, of KEVLAR being a registered trademark of the company Dupont de Nemours, with a highly reduced hysteresis.

Under the flexible skin 3, very small actuators 4, with shape memory, can be placed, making it possible to deform the flexible skin 3. The shape memory mini-actuators 4 may be of shape memory alloy type. The actuators 4 may be controlled by a computer 5. The computer 5 notably calculates a command 6 to be applied to each actuator 4 to deform the flexible skin 3 in order to modify the flow of the threads of air 7 over the surface of the flexible skin 3. The computer 5 calculates a deformation of the skin that is needed to modify the flow of the threads of air 7. A command 6 to be applied is therefore calculated according to the desired deformation. The calculation of the deformation to be applied to the flexible skin 3 takes into account a number of parameters. These parameters include the positions of the transition points between a laminar flow over the upper surface 2 of the wing 1 and a turbulent flow. The positions of the transition points are calculated according to one or more measurements made by sensors 8 distributed on or in the flexible skin 3. The sensors 8 may, for example, be glued to the flexible skin. In another embodiment, the sensors 8 may be incorporated in the structure of the flexible skin 3. The flexible skin 3 may, itself, be incorporated in the structure of the wing 1. The sensors 8 may be implemented by an optical fiber 8. The optical fiber 8 may be, for example, a monomode optical fiber. The deformation of the optical fiber caused by the presence of transition points may be measured by an interferometry method. In another embodiment, the optical fiber 8 may be a Bragg array optical fiber. A multimode amplified optical fiber may also be used. The deformations of the optical fiber 8 therefore make it possible to calculate the positions of the transition points. Then, notably according to the profile of the wing 1, the deformation to be applied to the flexible skin 3 is calculated. The optical fibers 8 in fact make it possible to detect a low noise on the flexible skin 3 and therefore to detect a turbulence in the flow of the threads of air over the flexible skin 3.

Figure 2:
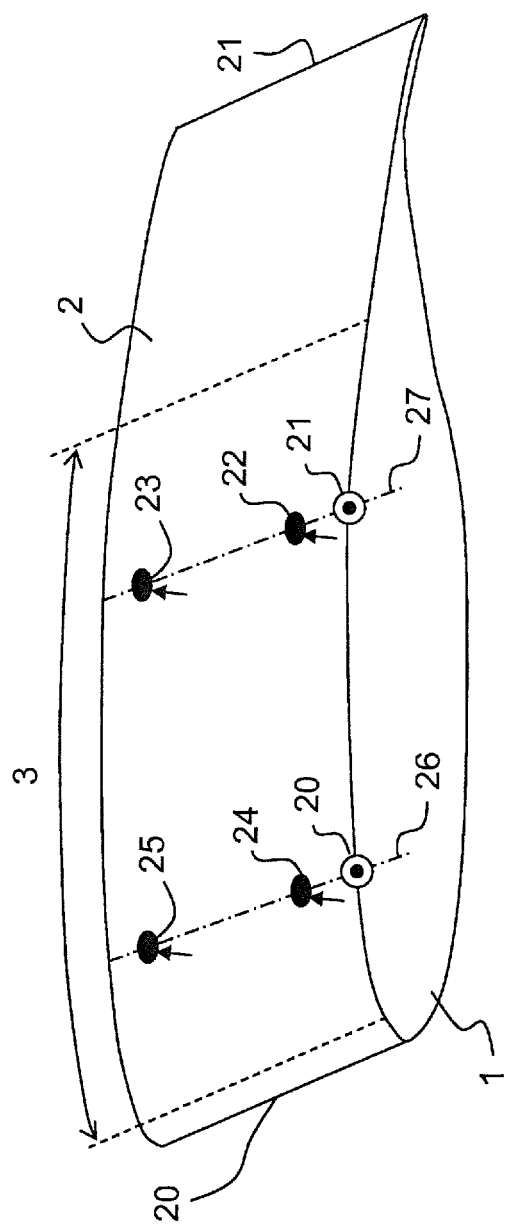
FIG. 2: a diagram of a deformable wing used to implement the invention.

FIG. 2 shows an exemplary layout of the actuators 4, represented in FIG. 1, on a wing 1 of an aircraft. A flexible skin 3 covers a part of the external surface of the upper surface 2 of the wing 1. The flexible skin 3 is situated between the leading edge 20 and the trailing edge 21 of the wing 1. The flexible skin 3 may, for example, extend between 1% and 65% of the cord of the wing 1, starting from the leading edge 20. The flexible skin 3 may be deformed at a number of points by a number of actuators 22, 23, 24, 25. The actuators 22, 23, 24, 25 may be distributed under the flexible skin 3 in one or more lines of actuators 26, 27. In FIG. 2, for example, two lines 26, 27 of actuators are shown. The lines of actuators 26, 27 are substantially parallel to the leading edge 20 of the wing 1. The lines of actuators 26, 27 are situated for example, in FIG. 2, respectively at approximately 20% and 40% from the leading edge 20 on the cord of the wing 1. In FIG. 2, given as an example, the actuators 22, 23, 24, 25 are distributed in pairs on the lines of actuators 26, 27. The actuators 22, 23, 24, 25 deform the flexible skin 3 by a pressure exerted substantially vertically from the inside of the wing 1 to the outside of the wing 1. On each line of actuators 26, 27, sensors sensing deformations of the flexible skin 3 can be placed on control points 20, 21. The sensors sensing deformation of the flexible skin 3 are required to measure the actual deformation of the flexible skin 3 following a stressing of the flexible skin 3 by the actuators 22, 23, 24, 25. The actual deformation of the flexible skin 3 depends notably on the force applied, but also on the resistance of the flexible skin 3.

Figure 3:
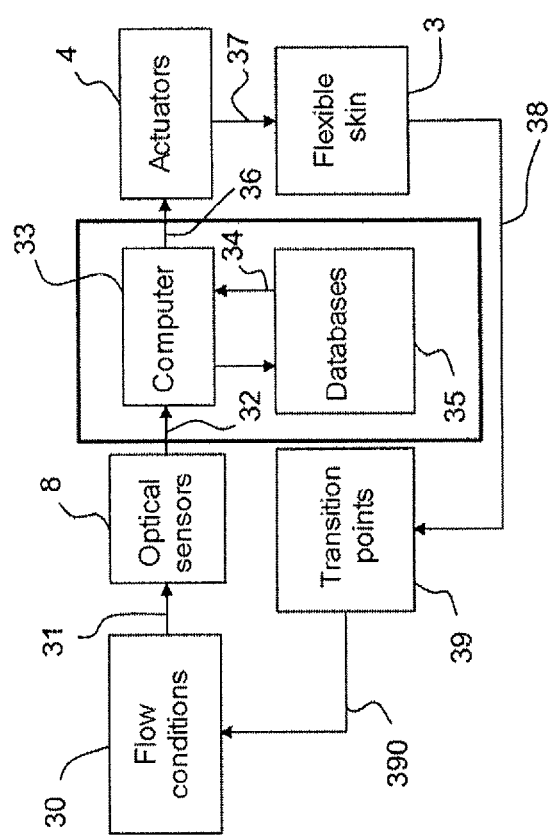
FIG. 3: a general diagram of the deformation method according to the invention.

FIG. 3 schematically represents the method for deforming an aerodynamic profile according to the invention, implemented for a wing of an aircraft.

The flow conditions of the threads of air 7 represented in FIG. 1 can be measured notably by optical sensors 8, in order to determine the positions of the transition points between a laminar flow and a turbulent flow of the threads of air 7. The measurement 31 of flow condition variables may be a first step 31 in the method according to the invention. The measurements made notably by the optical sensors 8 are then transmitted during a second step 32 to a computer 33. The computer 33, connected to 34 to databases 35, notably calculates set points 36 to be applied by the actuator(s) 4, 22, 23, 24, 25. The actuators 4 therefore exert one or more pressures 37 on the flexible skin 3. The flexible skin 3 is deformed under the pressures 37. The deformation of the flexible skin 3 leads to a modification 38 of the positions of the transition points 39. The modification 38 of the positions of the transition points 39 leads to a modification 390 of the flow conditions 30. The modification 390 of the flow conditions 30 is detected by the optical sensors 8 and transmitted to the computer 33 which can, if necessary, correct the pressure(s) exerted 37 by the actuator(s) 4. Any modification to the flow of the threads of air 7 can therefore lead to a modification of the pressures exerted 37 by the different actuators 4 on the flexible skin 3, in order to distance the transition points 39 as far as possible from the leading edge of the wing 1.

Figure 4:
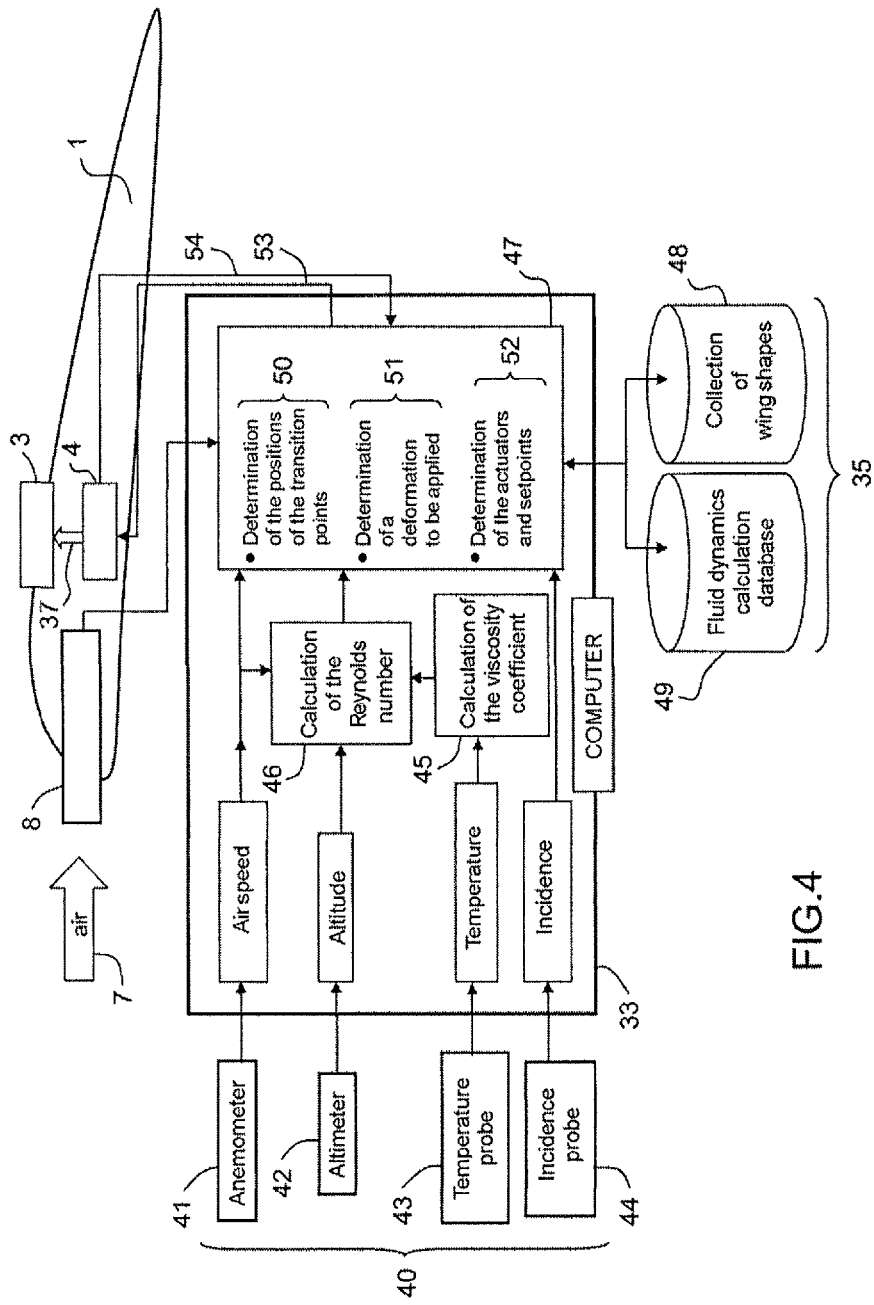
FIG. 4: a diagram of the various steps of the deformation method according to the invention.

FIG. 4 schematically represents the various processing operations performed by the computer 5, 33, represented in FIGS. 1 and 3. The computer 33 takes into account various physical parameters including the values originating notably from sensors 40 situated on the aircraft. Among the sensors 40 of the aircraft:

an anemometer 41 supplies an air speed value;
an altimeter 42 supplies an altitude value, enabling the computer 33 to calculate the density of the air;
a temperature probe 43 supplies an ambient temperature value;
an incidence probe 44, placed for example on the wing 1, supplies a value of the incidence of the wing 1 relative to a horizontal plane.

A first calculation 45 of a viscosity coefficient of the air is performed by the computer 33. The first calculation 45 notably takes into account the temperature measured by the temperature probe 43.

A second calculation 46 is used to determine the Reynolds number characteristic of the flow of the air and involved in the fluid dynamics equations. The Reynolds number is calculated notably according to the speed of the air measured by the anemometer 41, the altitude measured by the altimeter 42 and the viscosity coefficient calculated during the first calculation 45.

A third calculation 47 performed by the computer 33 is the calculation of the deformation set points to be applied by the actuators 4. The calculation of the deformations notably takes into account the following physical parameters:

the speed of the air measured by the anemometer 41;
the Reynolds number resulting from the second calculation 46;
the incidence measured by the incidence probe 44;
the pressure coefficients obtained from the optical sensors 8 situated on or in the flexible skin 3;
data from the various databases 35.

The pressure coefficients obtained from the optical sensors 8 are coefficients relating to a reference pressure and temperature coefficient, the reference pressure coefficient being measured on a reference optical fiber. A reference optical fiber, placed under the flexible skin, is needed to take into account the sensitivity of the optical fibers to temperature differences and thus reduce the error made on the pressure coefficient measured by the optical sensors 8. The pressure coefficient measured on the reference fiber therefore depends on the static temperature. The static temperature is the ambient temperature measured in shelter from the relative wind.

Various databases 35 can be connected to the computer 33. A first database 49 may comprise a collection of the shapes of the wing 1. The collection of the wing shapes defines the profile of the wing by a meshing of the surface of the wing 1. A second database, not shown in FIG. 4, may comprise the physical and mechanical characteristics and the position on the wing 1 of the actuators 4, 22, 23, 24. The third database, not shown in FIG. 4, may also comprise the physical and mechanical characteristics of the flexible skin 3.

A fourth database 49 may be a fluid dynamics calculation database. The fourth database 49 may comprise a library for calculating fluid dynamics enabling the computer 33 to solve the fluid flow equations in order to determine notably the positions of any transition points 39.

The third calculation 47 notably comprises the following steps:

A first calculation step 50 may be a determination of the presence of transition points followed by a calculation of the positions of the possible transition points on the wing 1. If no transition point is determined by the first calculation step 50, no set point 36 is addressed to the actuators. A detection of transition points may, possibly, be made cyclically in order to determine a formation of a turbulent flow on the upper surface of the wing 1. The detection of the transition points and the determination of their position notably takes into account the pressure coefficients obtained from the optical sensors 8, and the Reynolds number and the viscosity coefficient of the air. The first calculation step 50 notably uses the data from the fluid dynamics calculation database 49.

A second calculation step 51 may be a determination of a deformation to be applied to the flexible skin 3 to modify the position of the transition points 39 in order to distance them from the leading edge 20 of the wing 1. The determination of the deformation to be applied to modify the position of the transition points notably takes into account the physical and mechanical characteristics of the flexible skin 3, the shapes of the wing 1, the Reynolds number 46, the viscosity coefficient 45, and the data from the fluid dynamics calculation database 49.

A third calculation step 52 is then aimed at determining the actuators 4, 22, 23, 24, 25 that can be implemented to perform the deformation calculated during the second calculation step 51. The actuators 4, 22, 23, 24, 25 to be implemented may be determined by taking into account the positions of the various actuators 4, 22, 23, 24, 25 on the wing, the physical characteristics of the actuators 4, and the physical and mechanical characteristics of the flexible skin 3. This also makes it possible to determine a pressure 37 to be exerted by each actuator 4 selected on the flexible skin 3. Once the actuators have been determined, together with the pressure forces to be exerted, a pressure set point 53 can be sent to each selected actuator 4. Each actuator 4 receiving a pressure set point 53 applies it, thus producing a deformation of the external skin 3. Next, the actuators that have received the pressure set point 53 can send, in response to the computer 33, a value of the displacement that they have made 54, enabling, for example, the computer 33 to make a correction to the pressure set point 53, if the expected deformation of the flexible skin 3 has not occurred. Sensors sensing deformations of the flexible skin 3 can also transmit to the computer information concerning the actual deformation of the flexible skin, in order to modify the pressure set point 53 if the deformation result obtained is not the expected result. The method according to the invention thus comprises a feedback control with which to improve its performance.

Advantageously, the response times of various sensors 41, 42, 43, 44, combined with the calculation times, the reaction times of the actuators 4 and the response time of the flexible skin 3, make it possible to have a reaction time to a turbulent flow that is low enough, of the order of 5 milliseconds, to be able to be used during the flight in order to deform the profile of the wing 1.

The method according to the invention advantageously makes it possible to modify a profile of a wing 1 during flight. This therefore makes it possible to reduce the stalling speeds of an aircraft, thus making it possible to increase the safety level at low flying speeds. Furthermore, this makes it possible to extend the flight range of the aircraft, which may change with greater angles of incidence than the usual ones.

The method according to the invention also allows for a reduction in the drag of the aircraft by improving its aerodynamism. Reducing the drag of an aircraft makes it possible to reduce its energy consumption.

The method according to the invention can advantageously be applied generally to any type of aerodynamic surface in relative movement relative to a fluid. Notably, the method can be applied to mobile craft such as vehicles or ships or even submarines. The method according to the invention in fact makes it possible to improve the drag of an aerodynamic profile in relative movement relative to a fluid.

The method according to the invention can advantageously be applied to a blade profile for wind turbines or even for turbine blades of hydraulic plants, or aircraft blades for example.

The method according to the invention advantageously makes it possible to increase the drag of the blades when the latter are operating in order to produce maximum energy efficiency. The drag can be increased by modifying the profile of the blades. A modification of the turbulent flow is obtained in the same way as described previously, by modifying the positions of the transition points. The method can also make it possible to reduce the drag of the blades when the latter are at rest, that is to say not used, in order to avoid unwanted rotation that might damage them. The reduction of the drag of the blades can be obtained, as described previously, by modifying the positions of the transition points between the turbulent and laminar flows over the blades.

The invention claimed is:

1. A method for actively deforming, by feedback control, an aerodynamic profile comprising an elastic material, applied to a part of the surface of the aerodynamic profile, said elastic material being in contact with a fluid flow; said elastic material being able to be deformed by one or more shape memory actuators), placed in contact with the elastic material, said actuators being controlled by a computer connected to sensors, said method comprising at least the following steps:
   measurements of physical fluid flow condition variables by the sensors;
   transmissions of the measured physical flow condition variables to the computer;
   detection of possible transition points between a laminar flow and a turbulent flow of the fluid over the elastic material according to the measured physical flow condition variables;

calculation of a deformation to be applied to the elastic material according to positions of the detected transition points;

calculation of one or more set points to be applied by one or more actuators to obtain the deformation to be applied to the elastic material;

transmission of the calculated set point to the actuators;

deformation of the elastic material by the actuators;

measurement of the actual deformation of the elastic material;

calculation of a new set point to be applied by one or more actuators according to the actual deformation of the elastic material.

2. The deformation method as claimed in claim 1, wherein the detection of transition points comprises:

a first calculation of the viscosity coefficient of the fluid;

a second calculation of the Reynolds number characteristic of the flow of the fluid over the elastic material;

a third calculation of the positions of the possible transition points, including the Reynolds number, the viscosity coefficient of the fluid, an angle of incidence of the profile in the fluid relative to a horizontal plane, a speed of flow of the fluid, fluid dynamics calculation data originating from a database.

3. The deformation method as claimed in claim 2, wherein the third calculation of the positions of the transition points takes into account pressure coefficients of sensors based on optical fibers placed on the surface of the elastic material.

4. The deformation method as claimed in claim 2, wherein the third calculation of the positions of the transition points takes into account pressure coefficients of sensors based on optical fibers placed in the elastic material.

5. The deformation method as claimed in claim 3, wherein the pressure coefficients are coefficients relating to a reference pressure and temperature coefficient, measured by a reference optical fiber placed under the elastic material.

6. The deformation method as claimed in claim 1, wherein the calculation of a deformation to be applied takes into account the shape of the profile, the physical characteristics of the elastic material.

7. The deformation method as claimed in claim 1, wherein the calculation of the set points takes into account the mechanical characteristics of the actuators, the physical characteristics of the elastic material.

8. The deformation method as claimed in claim 1, being applied to the deformation of an elastic material that is able to resume its initial shape after deformation.

9. The deformation method as claimed in claim 1, implementing actuators produced from a shape memory alloy.

10. The deformation method as claimed in claim 1, implementing actuators distributed over one or more lines of actuators, said lines of actuators being distributed under the elastic material.

11. The deformation method as claimed in claim 1, being applied to an aerodynamic profile in contact with air.

12. The deformation method as claimed in claim 1, being applied to a wing profile of an aircraft.

13. The deformation method as claimed in claim 1, implementing actuators distributed over lines of actuators that are substantially parallel to a leading edge of the wing profile.

14. The deformation method as claimed in either one of claim 12, wherein the calculation of the Reynolds number takes into account the flow speed of the fluid, the altitude of the aircraft, the viscosity coefficient of the fluid.

15. The deformation method as claimed in claim 12, wherein:

the flow speed of the fluid originates from an anemometer situated on the aircraft;

the altitude originates from an altimeter situated on the aircraft;

the temperature originates from a temperature probe situated on the aircraft;

the angle of incidence originates from an incidence probe situated on the aircraft.

16. The deformation method as claimed in claim 1, being applied to blades of a wind turbine.

17. The deformation method as claimed in claim 1, being applied to an aerodynamic profile immersed in water.

18. The deformation method as claimed in claim 1, being applied to blades of a turbine.

19. The deformation method as claimed in claim 1, being applied to an aerodynamic profile of a ship.

20. The deformation method as claimed in claim 1, being applied to an aerodynamic profile of a submarine.

21. The deformation method as claimed in claim 1, being applied to the deformation of a flexible skin comprising para-aramid synthetic fiber.

* * * * *